United States Patent
Robertsson et al.

(10) Patent No.: US 9,658,353 B2
(45) Date of Patent: May 23, 2017

(54) REGULATING COHERENT BOUNDARY REFLECTIONS DURING GENERATION OF A MODELED WAVEFIELD

(75) Inventors: Johan O. A. Robertsson, Grantchester (GB); Robin Fletcher, Guildford (GB)

(73) Assignee: WESTERNGECO L.L.C., Houston, TX (US)

( * ) Notice: Subject to any disclaimer, the term of this patent is extended or adjusted under 35 U.S.C. 154(b) by 1687 days.

(21) Appl. No.: 12/817,308

(22) Filed: Jun. 17, 2010

(65) Prior Publication Data

US 2011/0310699 A1 Dec. 22, 2011

(51) Int. Cl.
*G01V 1/28* (2006.01)
*G01V 1/38* (2006.01)

(52) U.S. Cl.
CPC .............. *G01V 1/282* (2013.01); *G01V 1/38* (2013.01); *G01V 2210/67* (2013.01)

(58) Field of Classification Search
USPC .............................. 367/50–54, 73; 702/14, 16
See application file for complete search history.

(56) References Cited

U.S. PATENT DOCUMENTS

| | | | |
|---|---|---|---|
| 4,809,235 A | 2/1989 | Dragoset, Jr. | |
| 4,982,382 A * | 1/1991 | Dablain | 367/73 |
| 5,999,488 A | 12/1999 | Smith | |
| 5,999,489 A * | 12/1999 | Lazaratos | 367/57 |
| 6,125,330 A * | 9/2000 | Robertson et al. | 702/14 |
| 6,687,659 B1 * | 2/2004 | Shen | 703/2 |
| 7,715,985 B2 * | 5/2010 | Van Manen et al. | 702/14 |
| 7,974,824 B2 * | 7/2011 | Song | 703/10 |
| 2008/0011540 A1 | 1/2008 | Moldoveanu et al. | |
| 2010/0054082 A1 | 3/2010 | McGarry et al. | |

OTHER PUBLICATIONS

International Search Report and Written Opinion of PCT Application No. PCT/US2011/040700 dated Feb. 29, 2012: pp. 1-9.
Chen, et al., Two Kinds of Separable Approximations for the One-Way Wave Operator, Geophysics, Jan.-Feb. 2006, pp. T1-T5, vol. 71, No. 1.
Clapp, Reverse Time Migration with Random Boundaries, SEG Houston 2009 International Exposition and Annual Meeting, pp. 2809-2813.
Zhang, et al., One-Step Extrapolation Method for Reverse Time Migration, Geophysics, Jul.-Aug. 2009, pp. A29-A33, vol. 74, No. 4.
Gjurchinovski, The Doppler Effect from a Uniformly Moving Mirror, European Journal of Physics, 2005, pp. 643-646, vol. 26.

* cited by examiner

*Primary Examiner* — Ian J Lobo

(57) ABSTRACT

A technique includes receiving data indicative of a wavefield in a processor-based system and processing the data on the processor-based system to generate a modeled wavefield. The processing includes varying boundary conditions of the modeled wavefield with respect to time to regulate coherent boundary reflections in the modeled wavefield.

26 Claims, 23 Drawing Sheets

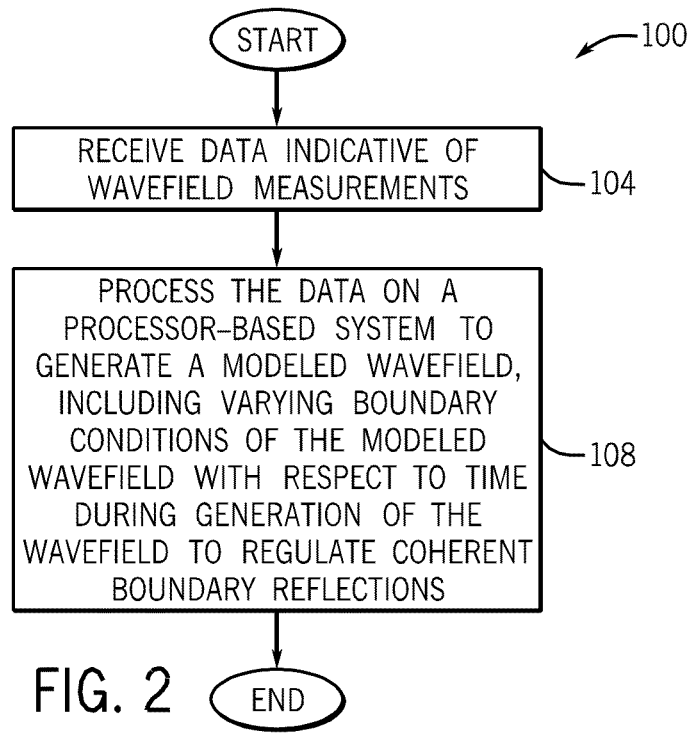

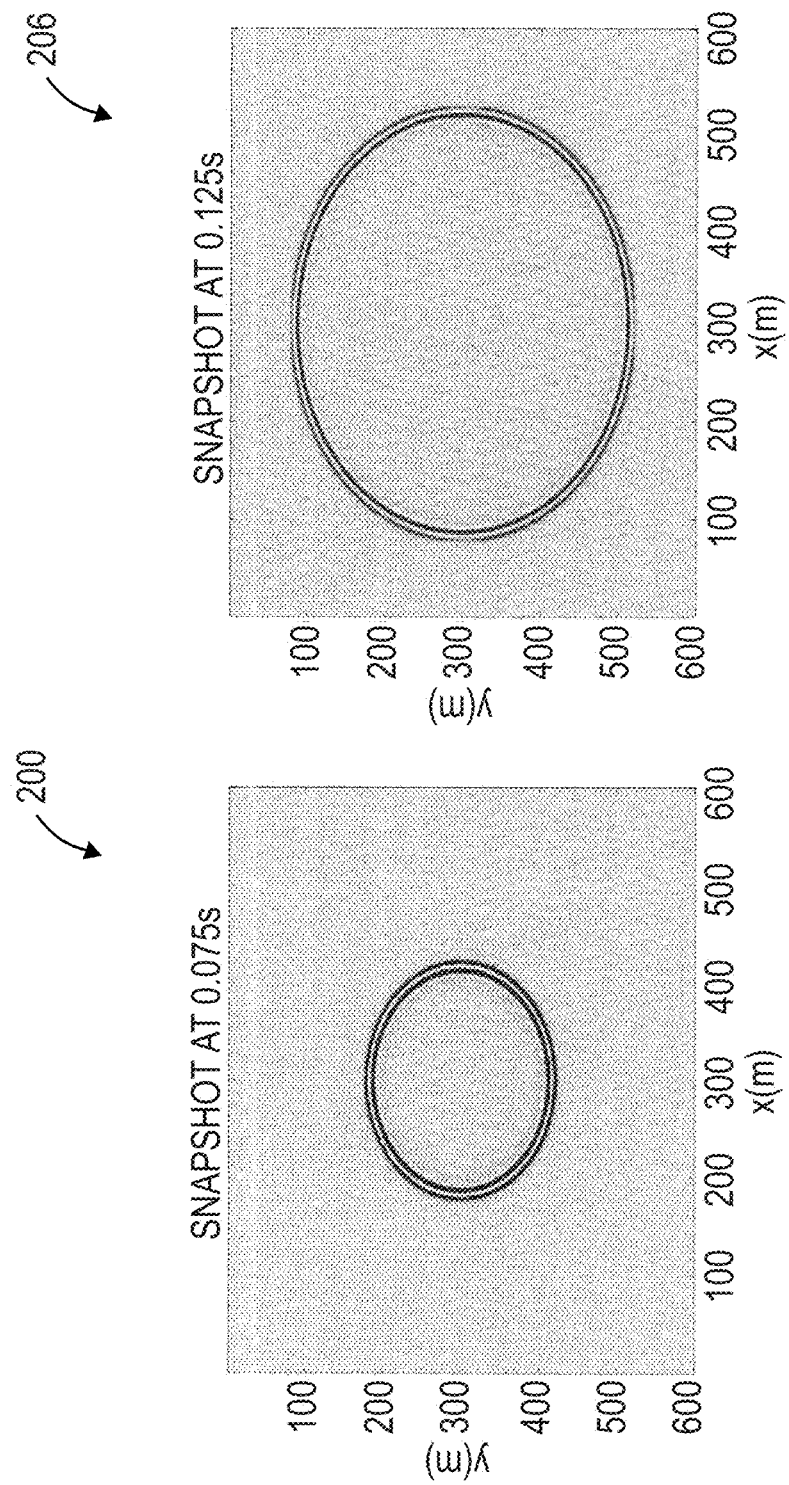

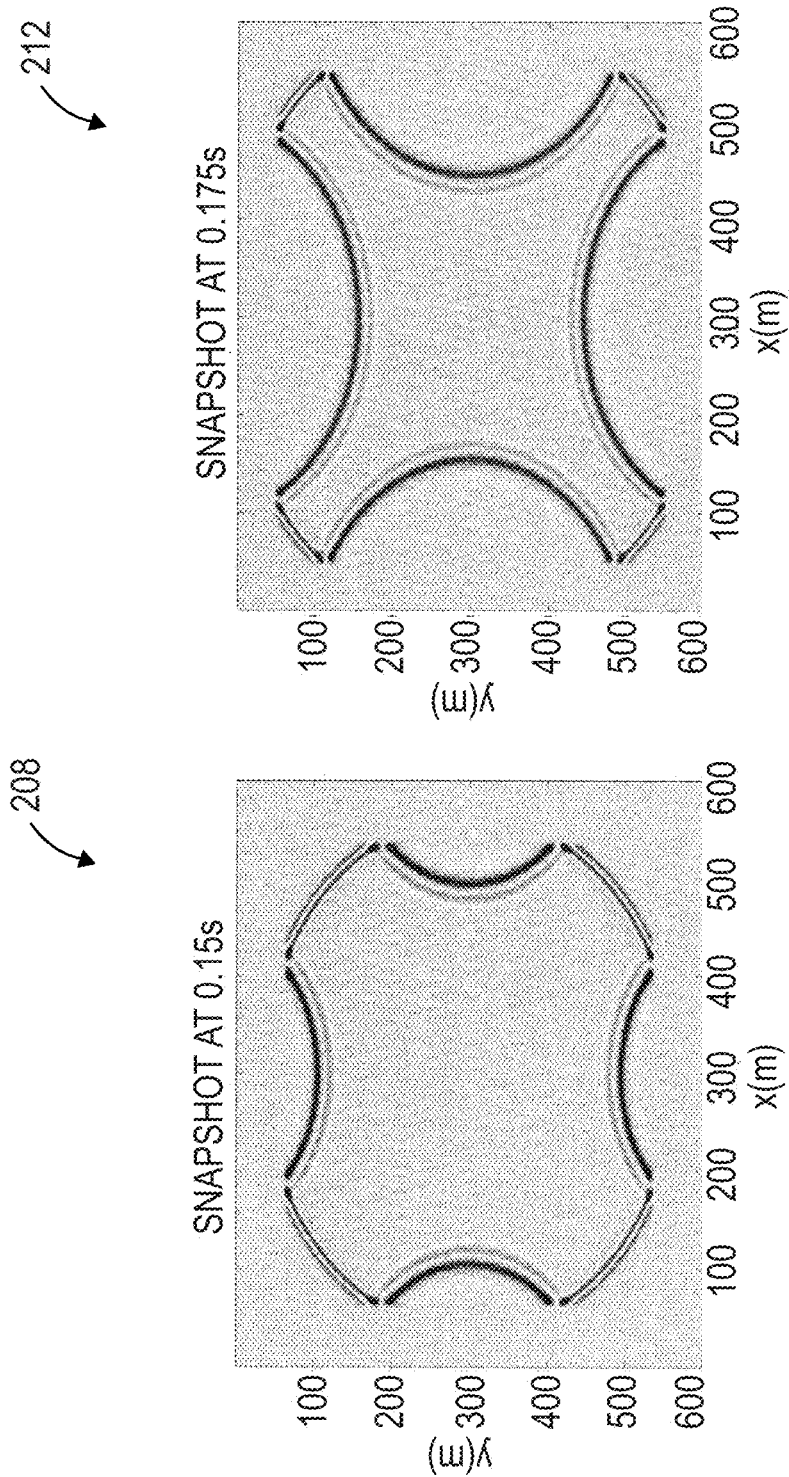

REGULATING COHERENT BOUNDARY REFLECTIONS DURING GENERATION OF A MODELED WAVEFIELD

BACKGROUND

The invention generally relates to regulating coherent boundary reflections during generation of a modeled wavefield.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

The measurements acquired in the seismic acquisition may be used to model wave propagation. The modeled wave propagation may be used in connection with full waveform inversion and/or reverse time migration to produce a velocity model of the subsurface.

The computational domain used in the modeling of the wavefield is finite, which introduces challenges in emulating a theoretically infinite wavefield. Therefore, there is a continuing need for better ways to model a wavefield using a finite computational domain.

SUMMARY

In an embodiment of the invention, a technique includes receiving data indicative of a wavefield in a processor-based system and processing the data on the processor-based system to generate a modeled wavefield. The processing includes varying boundary conditions of the modeled wavefield with respect to time during the generation to regulate coherent boundary reflections.

Advantages and other features of the invention will become apparent from the following drawing, description and claims.

BRIEF DESCRIPTION OF THE DRAWING

FIGS. 2, 3, 4, 5 and 14 are flow diagrams depicting techniques to generate a modeled wavefield by varying boundary conditions of the modeled wavefield with respect to time during the generation of the wavefield according to embodiments of the invention.

FIGS. 6, 7, 8, 9, 10 and 11 are snapshots in time of a modeled waveform in which a Doppler shift is created in coherent boundary reflections according to an embodiment of the invention.

DETAILED DESCRIPTION

A subterranean structure may be surveyed for purposes of identifying subterranean bodies of interest, such as hydrocarbon reservoirs, fresh water aquifers, gas injection zones, etc. In this survey, a survey acquisition system collects data indicative of measurements acquired by survey receivers in response to a particular stimulus. The survey receivers may be electromagnetic (EM) receivers, sonic receivers, seismic receivers, etc., and the stimulus may be produced by a corresponding source, such as an EM source, sonic source, seismic source, etc.

Figure 1:
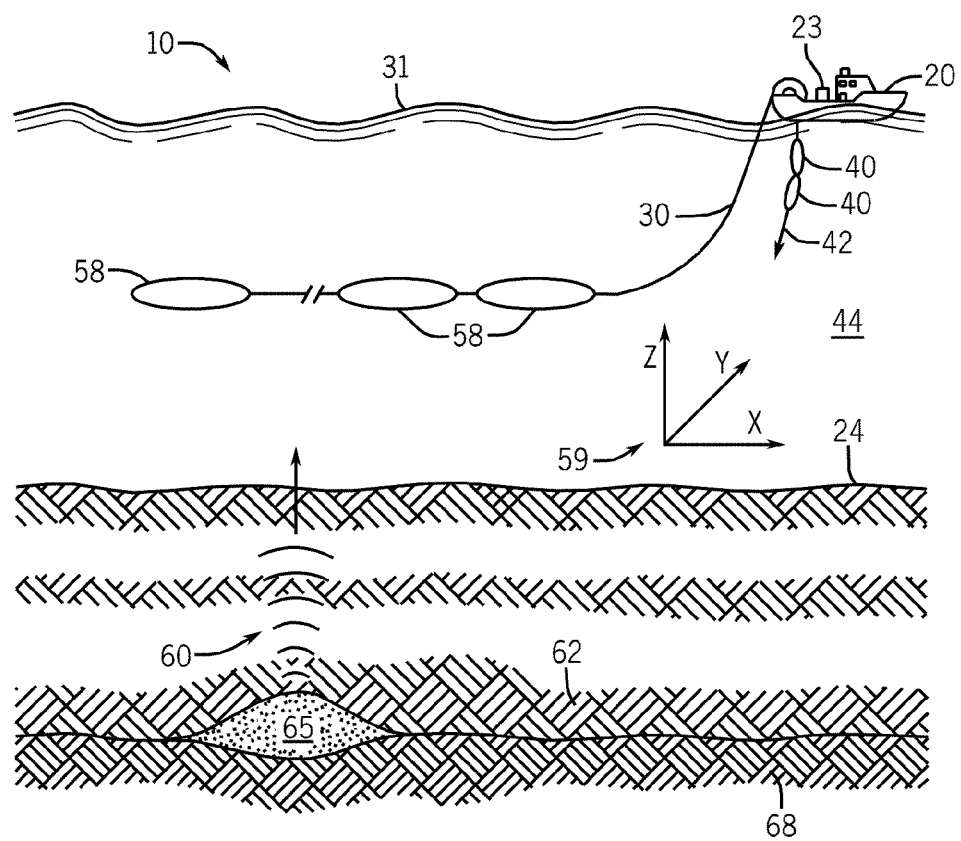
FIG. 1 is a schematic diagram of a marine seismic acquisition system according to an embodiment of the invention.

FIG. 1 depicts an embodiment 10 of a marine-based seismic data acquisition system to illustrate one out of the many possible data acquisition systems, which may be used to acquire survey data for identifying one or more subterranean bodies of interest. For the particular example depicted in FIG. 1, the system 10 includes a survey vessel 20 that tows one or more seismic streamers 30 (one exemplary streamer 30 being depicted in FIG. 1) behind the vessel 20. In one non-limiting example, the streamers 30 may be arranged in a spread in which multiple streamers 30 are towed in approximately the same plane at the same depth. As another non-limiting example, the streamers 30 may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensor units 58, which include, in accordance with some embodiments of the invention, multi-component sensors. Each multi-component sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular seismic sensor unit 58 may include at least one particle motion sensor for purposes of measuring a component of particle motion along a particular sensitive axis 59 (the x, y or z axis, for example). As a more specific example, the seismic sensor unit 58 may include a particle velocity sensor that is oriented to acquire a measurement of a particle velocity along the depth, or z, axis; a particle velocity sensor to sense a particle velocity along the crossline, or y, axis; a particle velocity sensor to sense a velocity along the inline, or x, axis; multiple particle velocity sensors to sense particle velocities along all three (x, y and z) axes; etc. Alternatively, in other embodiments of the invention, the particle motion sensor(s) of each seismic sensor unit 58 may sense a particle motion other than velocity (an acceleration, for example).

In addition to the seismic sensor units 58, the marine seismic data acquisition system 10 also includes one or more seismic sources 40 (two exemplary seismic sources 40 being depicted in FIG. 1), such as air guns and the like. In some embodiments of the invention, the seismic source(s) 40 may be coupled to, or towed by, the survey vessel 20. Alternatively, in other embodiments of the invention, the seismic source(s) 40 may operate independently of the survey vessel 20, in that the source(s) 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the source(s) 40 produce corresponding reflected acoustic signals, or pressure waves 60, which are sensed by the seismic sensors of the seismic sensor unit 58. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors of the seismic sensor units 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor unit 58 may provide a trace, which corresponds to a measure of a pressure wavefield by its hydrophone; and the seismic sensor unit 58 may provide (depending on the particular embodiment of the invention) one or more traces that correspond to one or more components of particle motion.

The goal of the seismic acquisition is to build up an image of a survey area for purposes of identifying subterranean geological formations or interest, such as the exemplary geological formation 65. Subsequent analysis of the representation may reveal, for example, probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a data processing system that may be, for example, located on land or on the vessel 20. An exemplary data processing system 420 (see FIG. 33) is discussed below.

The marine-based seismic acquisition system 10 is a one out of numerous types of seismic data acquisition systems, which may be used to acquire seismic measurement data, in accordance with embodiments of the invention. As other examples, a seismic data acquisition system may be a land or sea bed-based seismic acquisition system, in accordance with other implementations. As yet another example, the seismic data acquisition system may be disposed in a borehole. Thus, many different survey systems may be employed for acquiring seismic data indicative of a seismic wavefield. Additionally, the techniques and systems that are disclosed herein may be applied to measurements acquired of a wavefield other than a seismic wavefield. In this manner, in accordance with other embodiments of the invention, the system and techniques that are disclosed herein may be used in connection with data acquired by sensors of a sonic wavefield or sensors of an EM wavefield. Thus, many variations are contemplated and are within the scope of the appended claims.

For purposes of imaging a subterranean structure for identifying subterranean bodies of interest (hydrocarbon reservoirs, fresh water aquifers, gas injection subs, etc.), the survey data may be processed to model wave propagation for such purposes (as non-limiting examples), as performing full wavefield inversion and reverse time migration to develop a velocity model of the subsurface. One of the long-standing challenges in modeling wave propagation is how to truncate the modeled wavefield (as required by the finite computational domain) while at the same time emulating the wavefield as being infinite. In this regard, the boundaries imposed by the computational domain, as described herein, techniques and systems are disclosed herein to achieve this purpose.

More specifically, referring to FIG. 2 in an embodiment of the invention, a technique 100 includes receiving data indicative of wavefield measurements (sonic or seismic wavefield measurements, as examples) and processing the data (block 108) to generate a modeled wavefield (a sonic or seismic wavefield, as examples). This processing includes varying boundary conditions of the modeled wavefield with respect to time during generation of the wavefield to regulate coherent boundary reflections in the modeled wavefield.

One way to vary the boundary conditions is to expand and/or contract the computational domain during the wavefield simulation. More specifically, referring to FIG. 3, in accordance with some embodiments of the invention, a technique 120 includes receiving (block 124) data indicative of wavefield measurements and processing (block 128) the data on a processor-based system to generate a modeled wavefield, including during generation of the wavefield, moving boundaries of the modeled wavefield with respect to time. In general, the moving boundaries isolate boundary reflections from the recorded wavefield, which does not interact with the boundary. The isolation is caused at least in part by the moving boundary causing a Doppler shift to occur in the reflected wavefield. For narrow frequency bands, the energy due to the boundary reflections may therefore be shifted from the boundaries outside the frequency band of interest. The isolation is further enhanced, for the case where the computational domain is expanding, by the moving boundaries limiting the possible range of incidence angles on the boundary. Because many absorbing boundary conditions are particularly effective for incidence angles close to normal, their effectiveness is increased. The effective propagation velocity of the absorbing boundary condition is adjusted so that the velocity is the propagation velocity in the medium minus the speed of the moving boundary.

Figure 4:
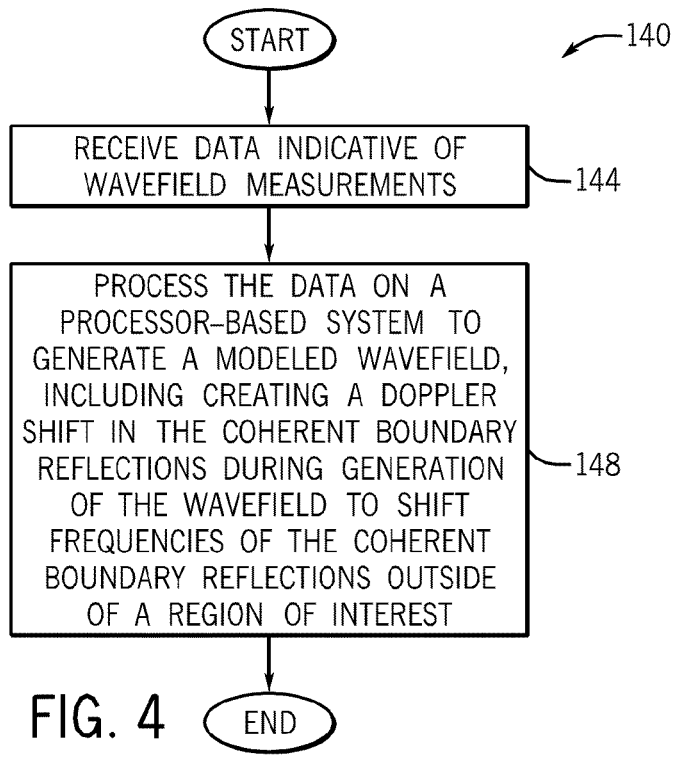

To summarize, in accordance with some embodiments of the invention, a technique 140 (see FIG. 4) includes receiving (block 144) data indicative of wavefield measurements and processing the data to generate a modeled wavefield, including creating a Doppler shift in the coherent boundary reflections during generation of the wavefield to shift frequencies of energy of the coherent boundary reflections outside of a range of interest, as depicted in block 148.

In accordance with some embodiments of the invention, the Doppler shift technique may be implemented in a finite-difference code of the scalar wave equation, which is a second order partial differential equation. The finite-difference implementation is explicit and based on standard Taylor-derived finite-difference approximations that are second order accurate in time (three point stencil) and are fourth-order accurate in space (five point stencil). The initial conditions are zero, and the boundary condition is implemented using a method of imaging, which ensures that the wavefield is zero at the boundary location by imaging the wavefield as an odd function across the boundary.

As an example, a simulation was performed with a grid that was expanded to emulate the Doppler boundary condition. The computational grid expanded by 148 meters (m) during the simulation, and at the end of the simulation, the grid was 600 m by 600 m. For this simulation example, the source was a Ricker wavelet with a center frequency of 100 Hertz (Hz) and was injected in the middle of the grid at coordinates of x=300 m and z=300 m, relative to the final size of the grid. The grid spacing was 1 m, and the time step was 0.25 milliseconds (ms). The simulation was run for 1000 time steps. The acoustic velocity in this homogenous model was $c_o$=2000 meters per second (m/s).

In the simulation, the computational boundary was moved with a velocity of $c_D$=−592 m/s in a Doppler shift such that a perpendicularly incident monochromatic wave with a frequency called "$f_O$" resulted in a reflected monochromatic wave with frequency $f_{new}$=0.5432 $f_O$. For waves incident at an oblique angle α with respect to the boundary, the frequency shift gradually decreased in the simulation with an increasing incidence angle, as described below:

$$f_{new} = \frac{1 - 2\frac{c_D}{c_0}\cos\alpha + \left(\frac{c_D}{c_0}\right)^2}{1 - \left(\frac{c_D}{c_0}\right)^2} f_0, \qquad \text{Eq. 1}$$

as derived in Gjurchinovski A., *The Doppler Effect From a Uniformly Moving Mirror*: European Journal of Physics, 26, No. 4, 643 (2005).

In the foregoing example, for a wave incident at 45°, the frequency shift is $f_{new}$=0.7333 $f_O$.

Figure 11:
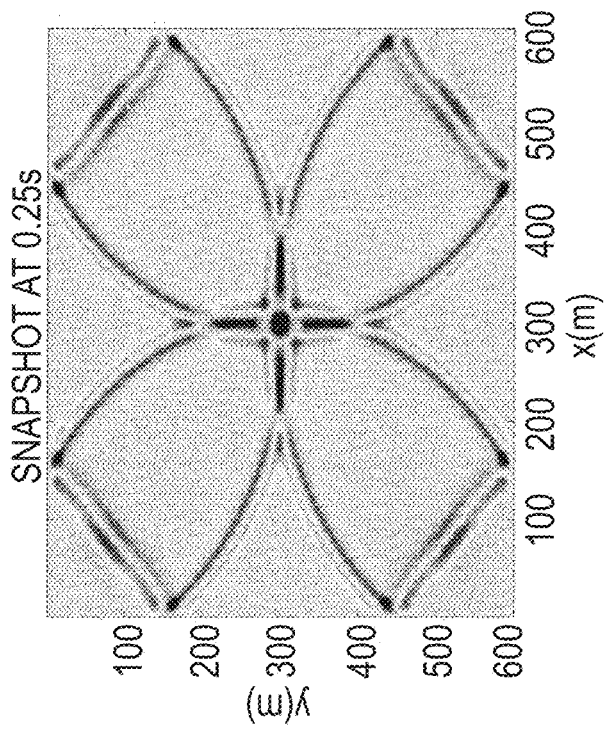
Figure 10:
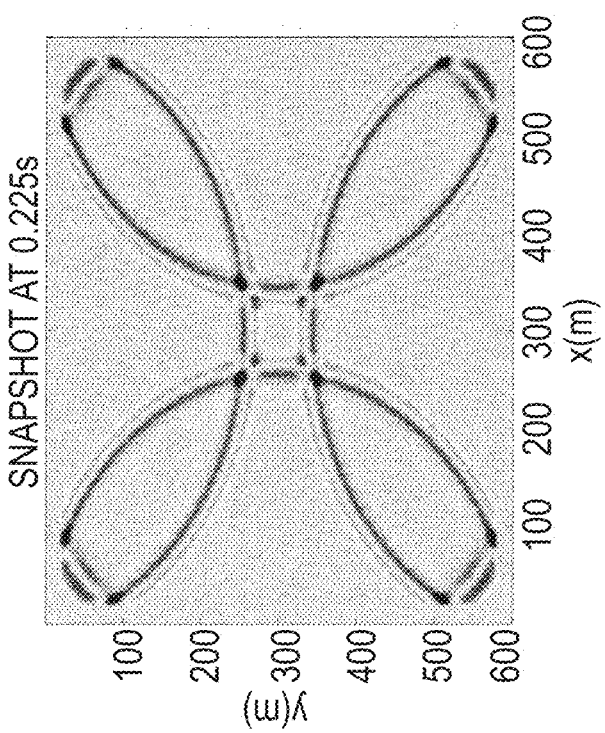

For the above-mentioned simulation, snapshots 200, 206, 208, 212, 216 and 220, which are depicted in FIGS. 6, 7, 8, 9, 10 and 11 respectively, were obtained at 75 ms, 125 ms, 150 ms, 175 ms, 225 ms and 250 ms, respectively. As can be seen from these figures, as the wavefield catches up with the moving boundary at 150 ms (see snapshot 208 in FIG. 8), a frequency shift in the reflected wave is observed. As the reflected wavefield interacts with the boundary a second and a third time, the resulting wavefield appears to have an increasingly lower frequency content, as depicted in snapshots 216 (FIG. 10) and 220 (FIG. 11).

Figure 12:
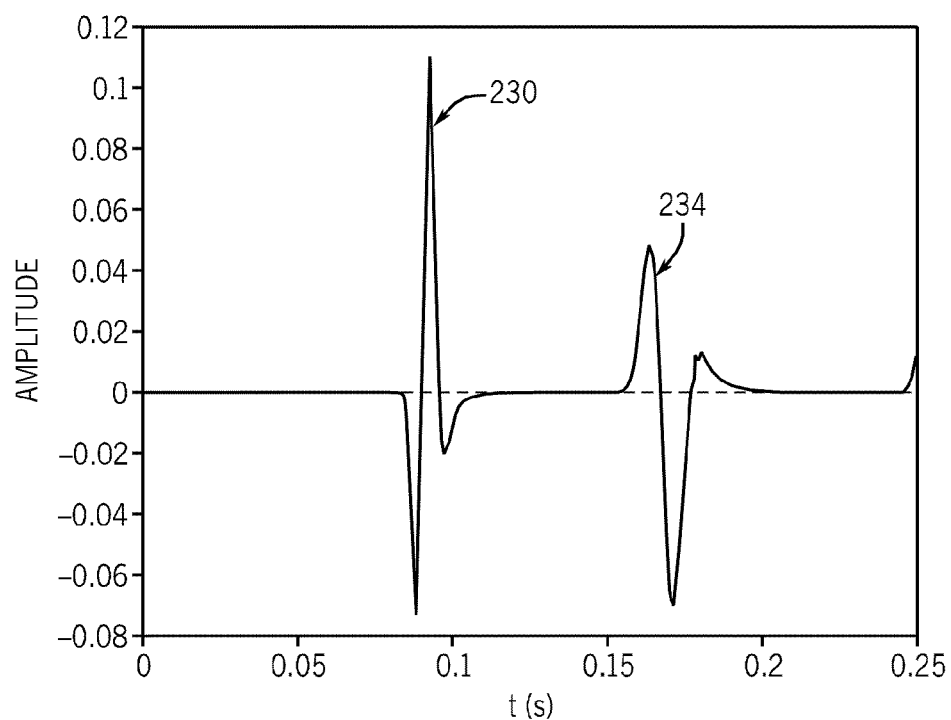
FIG. 12 depicts a seismogram recorded at different offsets according to an embodiment of the invention.

FIG. 12 depicts a seismogram recorded at the computational grid coordinates of x=150 m and z=300 m in the simulation. As depicted in FIG. 12, a first event 230 corresponds to the direct wave, and a second event 234 corresponds to the reflection from the boundary. The 180° phase shift between the events 230 and 234 is caused by the −1 reflection coefficient from a boundary where the wavefield is zero. As can also be seen from FIG. 12, there is a significant shift in frequency content to lower frequencies in the reflected event 234, due to the Doppler shift.

Figure 13:
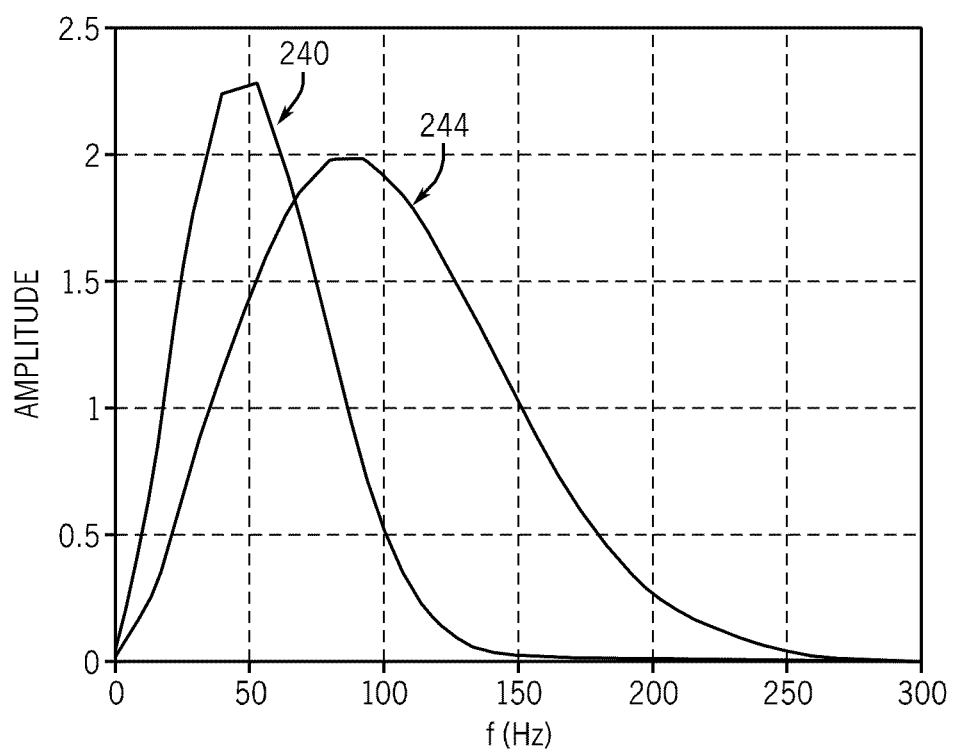
FIG. 13 illustrates spectra of the events depicted in FIG. 12 according to an embodiment of the invention.

The shift in frequency content is also observable in FIG. 13, where spectra of the two events 230 and 234 of FIG. 12 are plotted (i.e., spectra 244 for the first event 230 and spectra 240 for the second event 234). For this example, if frequencies of interest were in the range from 150 Hz to 250 Hz, then a high pass filter may be used to filter the data at 150 Hz to obtain an excellent absorbing boundary condition. As can be seen, the techniques that are disclosed herein are particularly suited for applications where narrow band sources are synthesized, which only requires the use of relatively small Doppler shifts.

Although a specific example is disclosed herein in which the computational boundaries and therefore computational grid are expanded during the simulation, a contracting grid may be used in accordance with other embodiments of the invention, which causes a Doppler shift toward higher frequencies.

Figure 5:
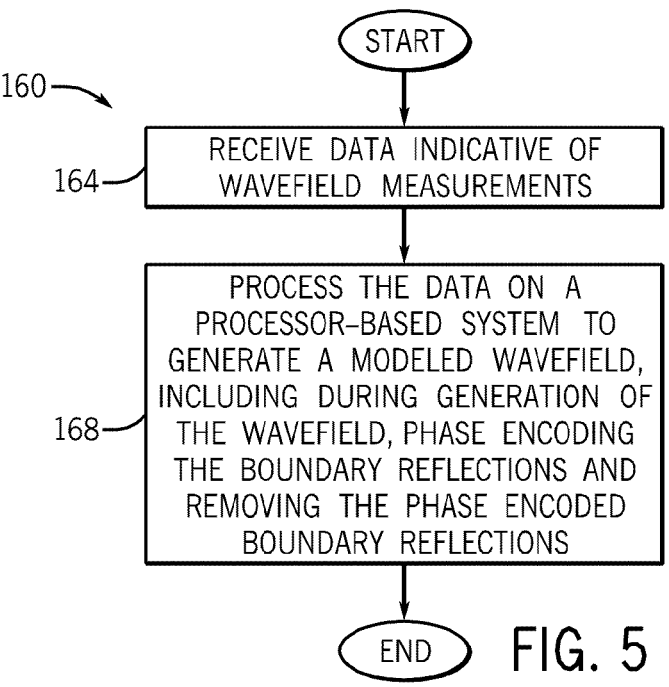

Encoding may be employed, in accordance with embodiments of the invention, for purposes of discriminating boundary reflections and removing them from the modeled wavefield. As a non-limiting example, referring to FIG. 5, in accordance with some embodiments of the invention, a technique 160 includes receiving data, which are indicative of wavefield measurements, pursuant to block 164; and moving the computational boundaries back and forth during the simulation to phase encode boundary reflections which can be used to identify and remove them from the total wavefield, pursuant to block 168.

Moving boundaries in a computational domain may also be useful for other purposes, such as modeling "real world" phenomena, such as moving boundaries that naturally move due to a rough sea surface, for example.

It is noted that in some full waveform inversion applications, the response of a monochromatic wave is synthesized. For such very narrow band signals, the boundary of the computational domain does not have to move particularly fast to induce a sufficiently large Doppler shift.

Figure 14:
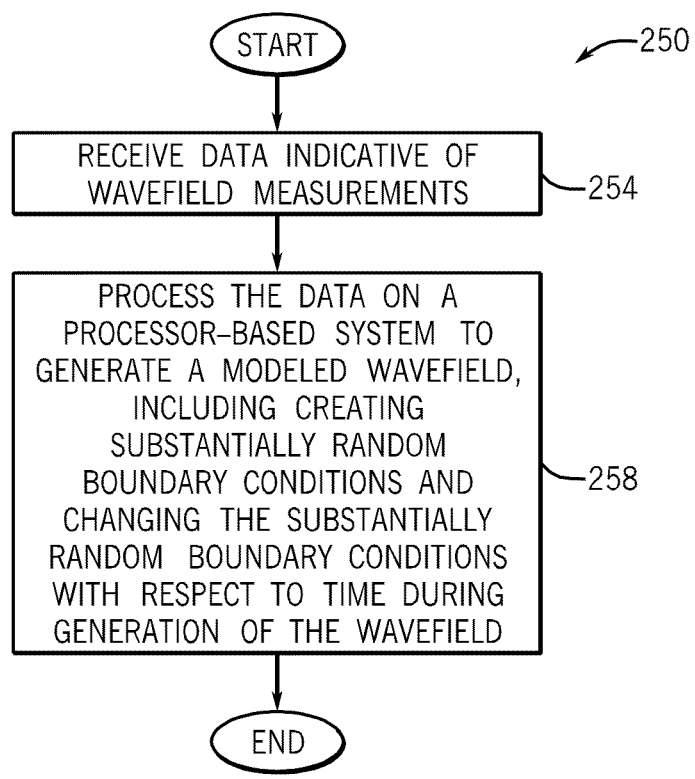
Figure 16:
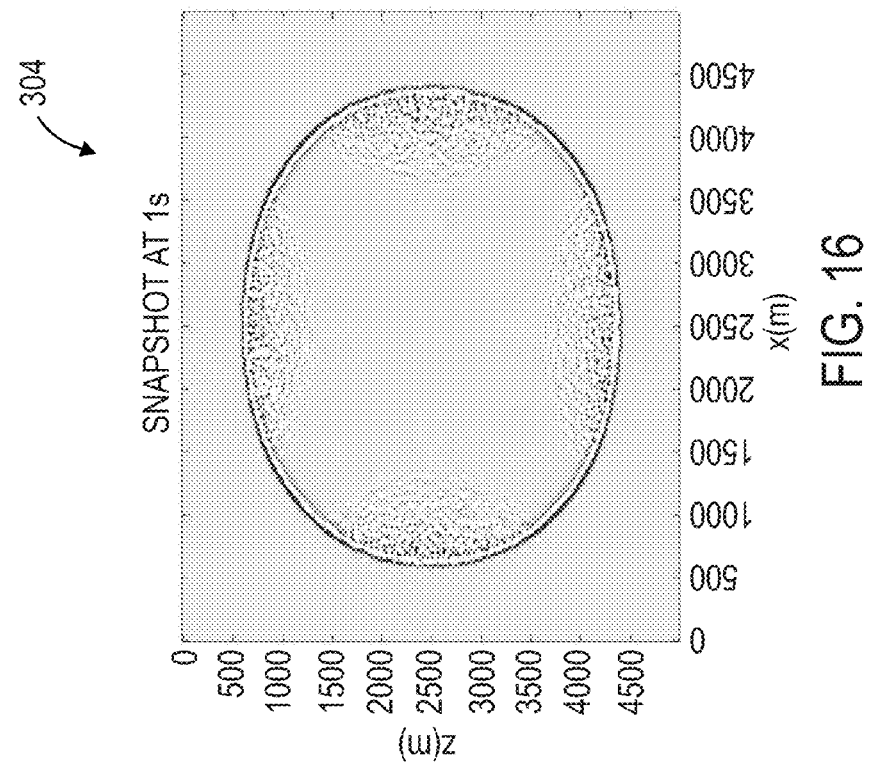
FIGS. 15, 16, 17, 18, 19 and 20 are snapshots in time of a modeled wavefield using a recursive integral time extrapolation algorithm according to an embodiment of the invention.
Figure 15:
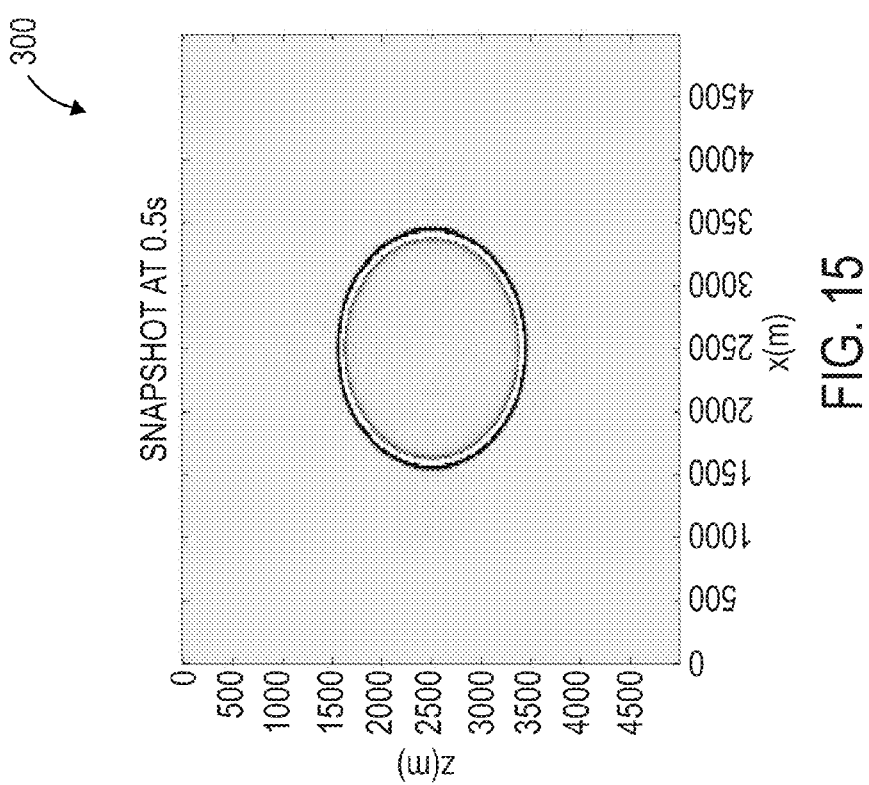
Figure 17:
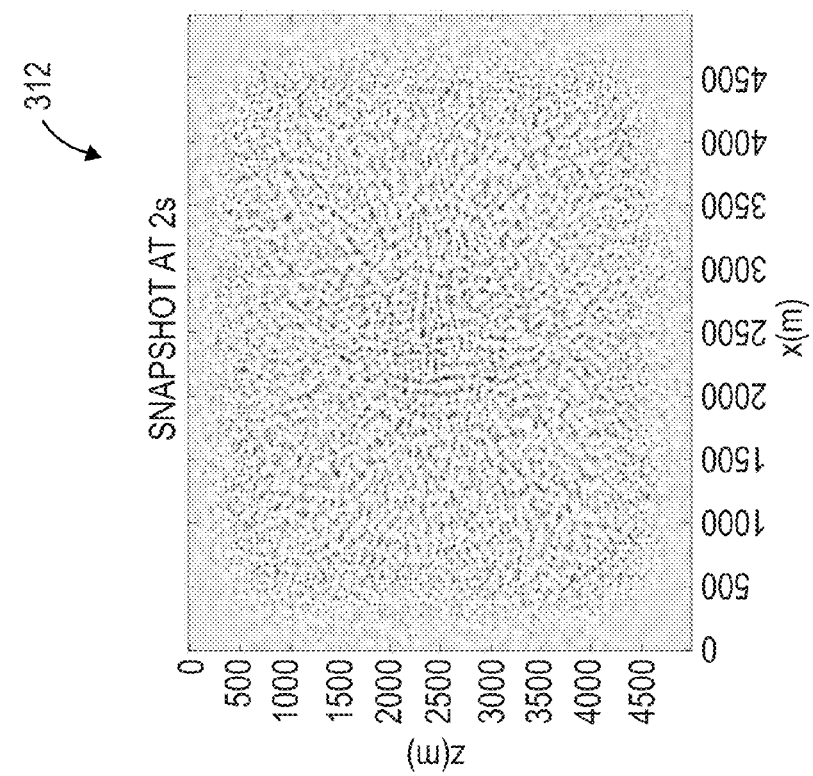
Figure 18:
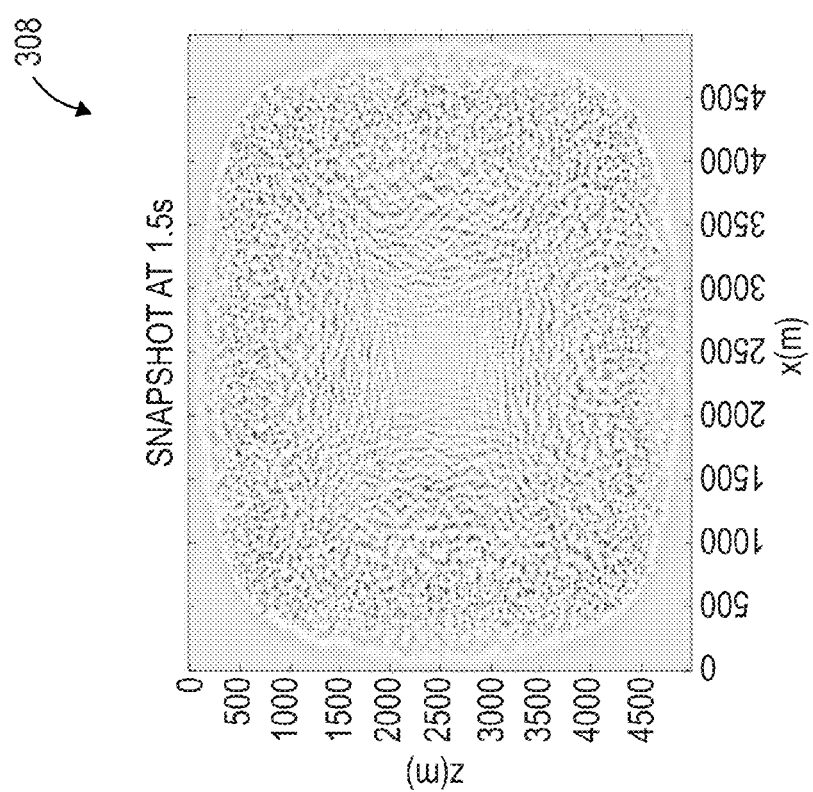
Figure 20:
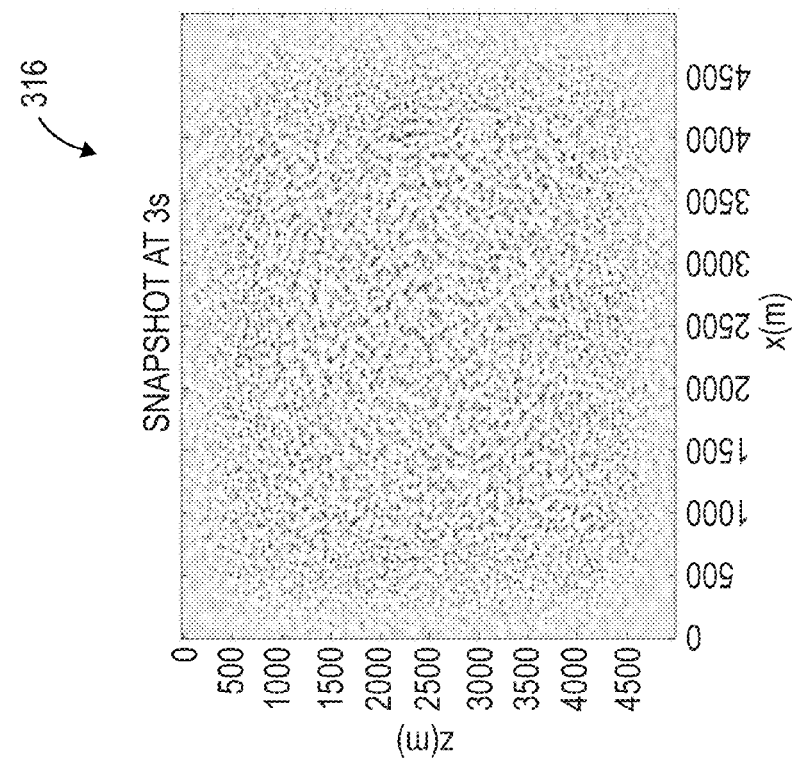
Figure 19:
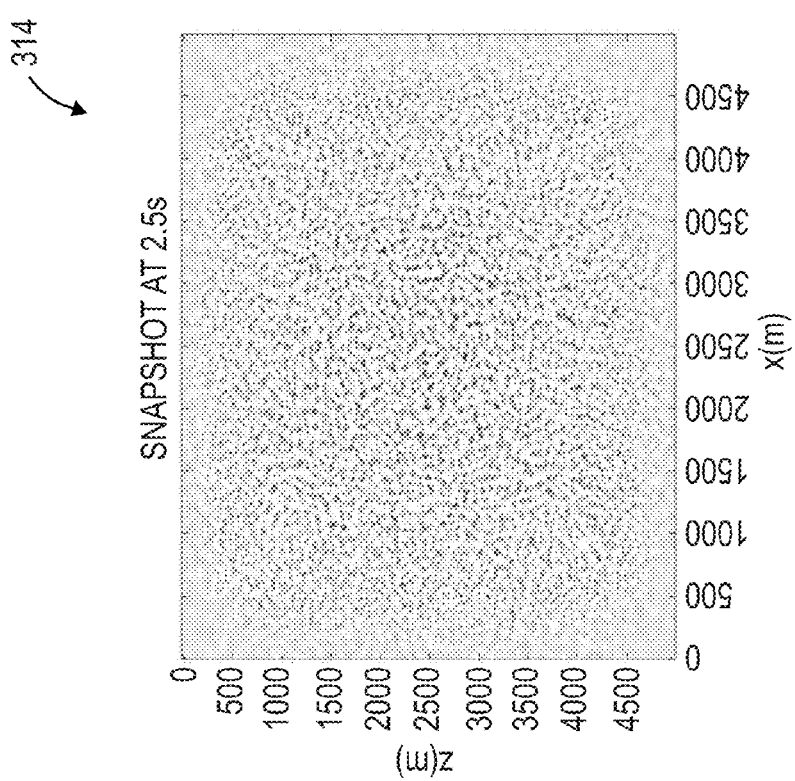
Figure 22:
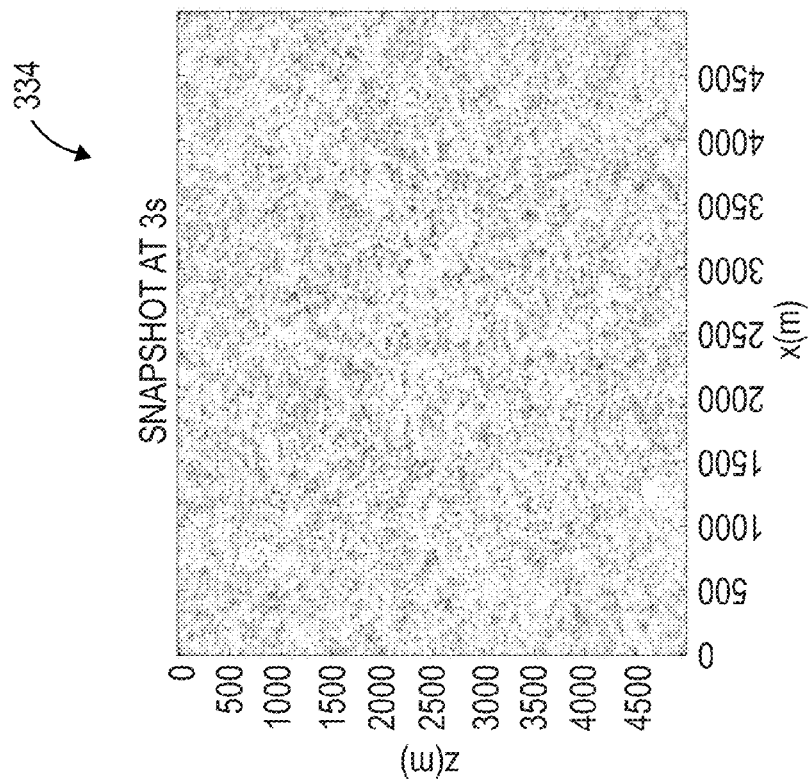
FIGS. 21, 22, 23, 24, 25 and 26 are snapshots in time of a modeled wavefield using a recursive integral time extrapolation algorithm according to an embodiment of the invention.
Figure 21:
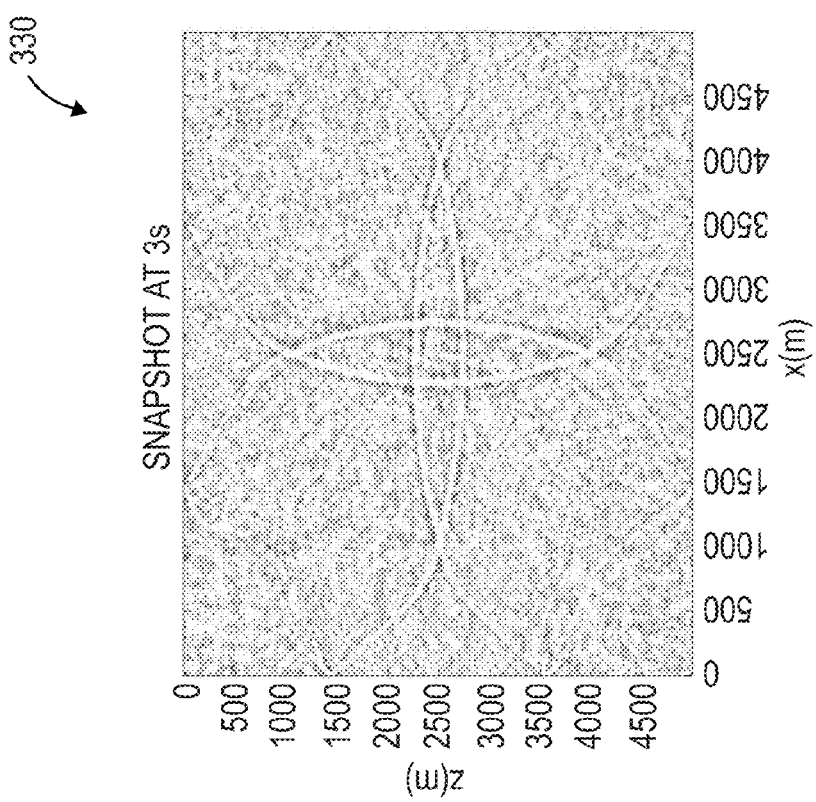
Figure 24:
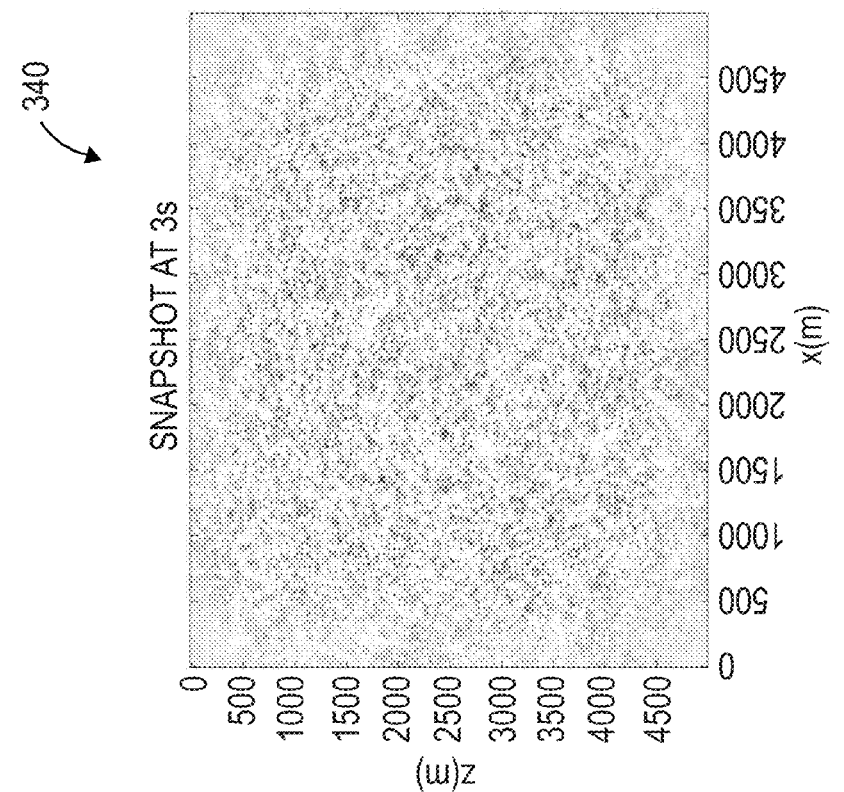
Figure 23:
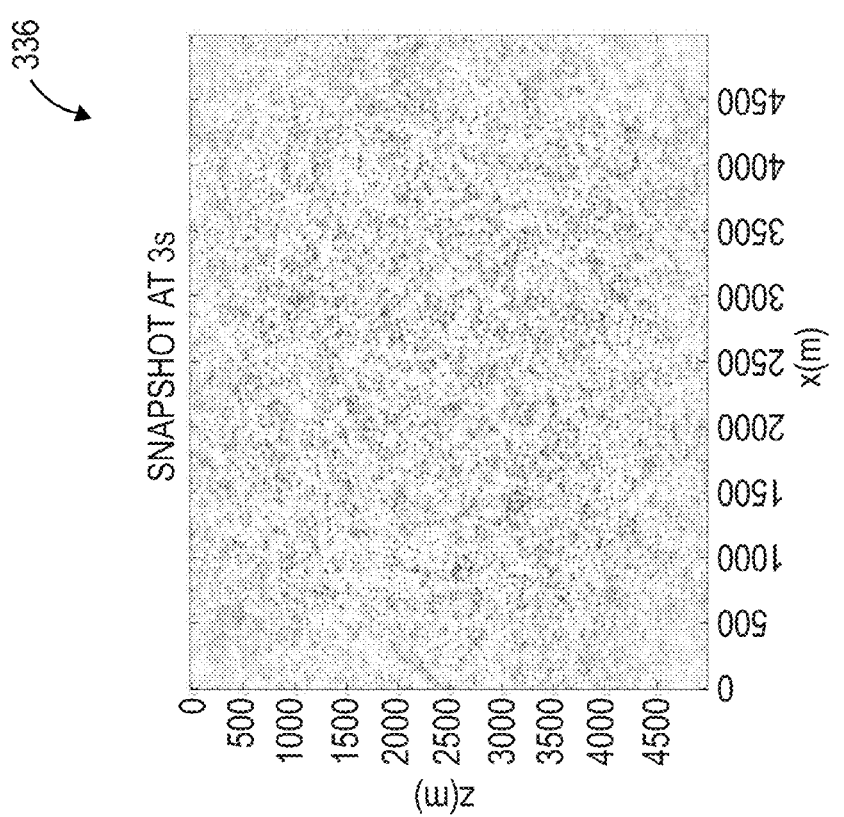
Figure 26:
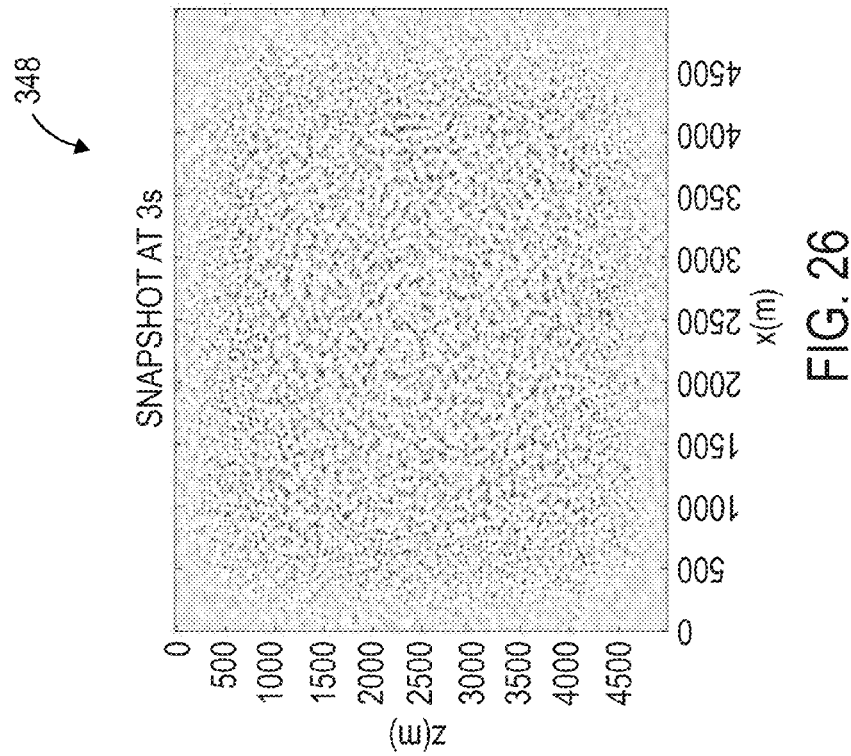
Figure 25:
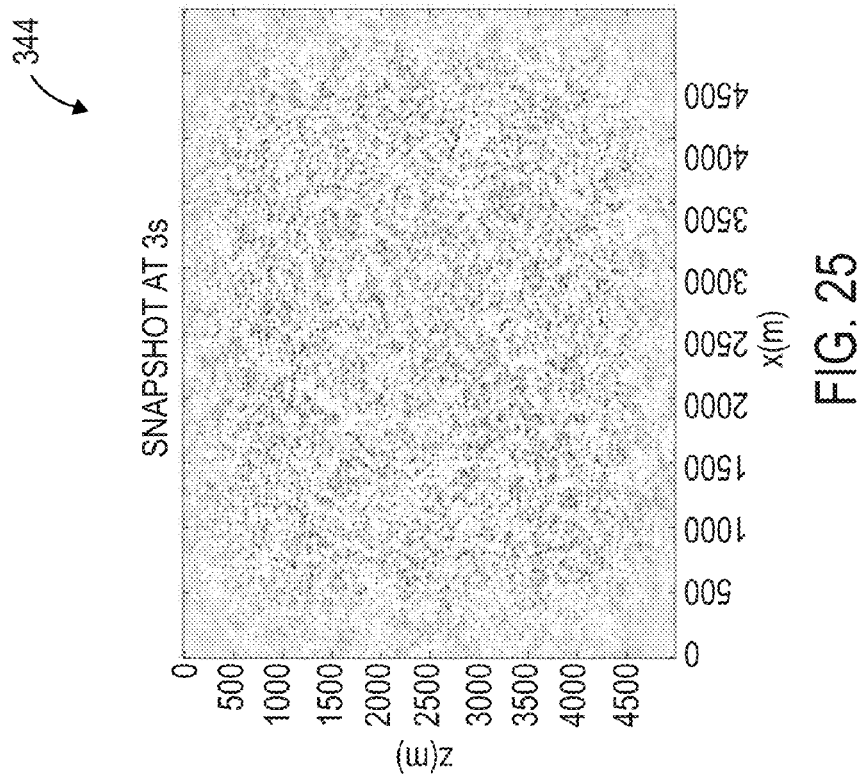
Figure 27:
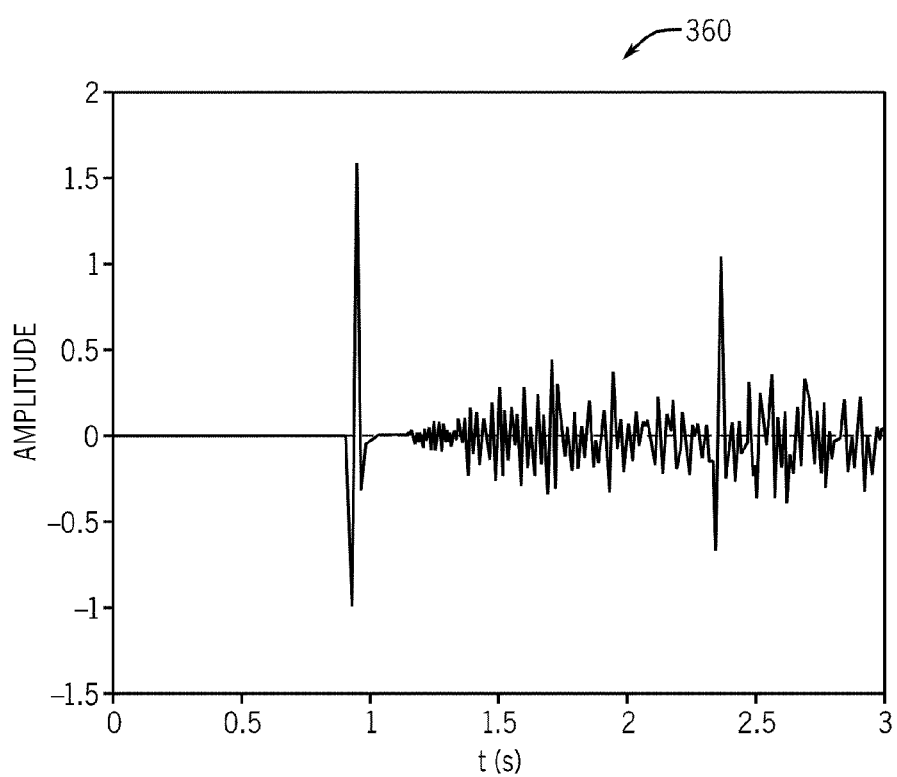
FIGS. 27, 28, 29, 30, 31 and 32 are seismograms illustrating a modeled wavefield using a recursive integral time extrapolation algorithm according to an embodiment of the invention.
Figure 28:
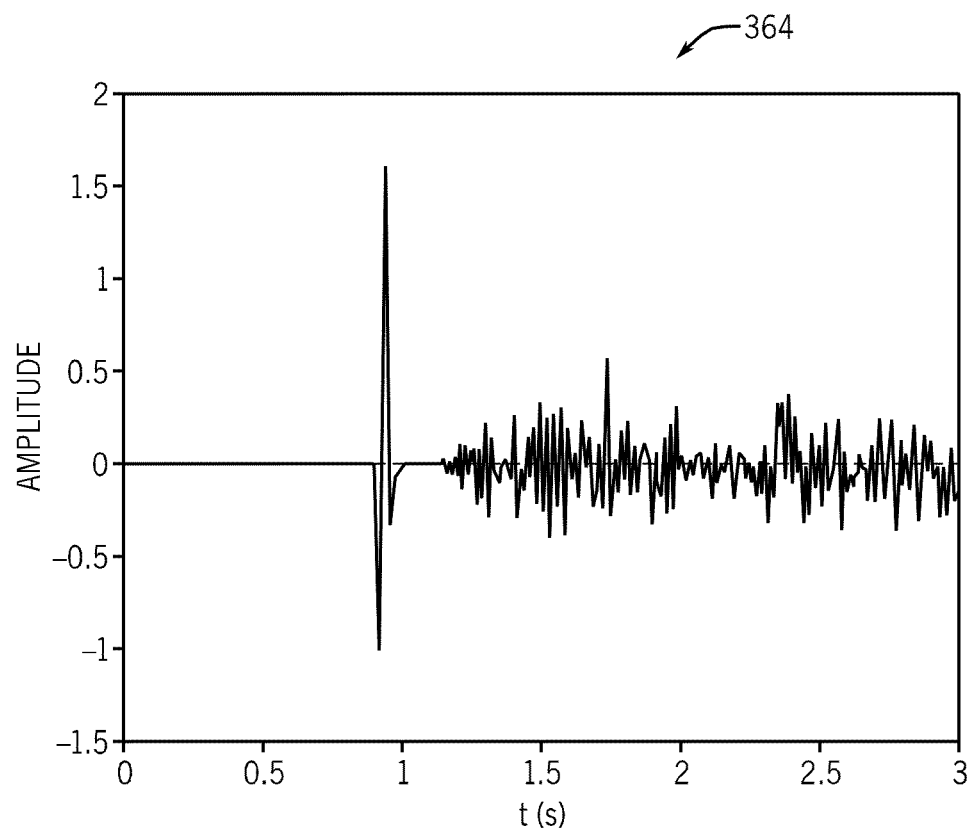
Figure 29:
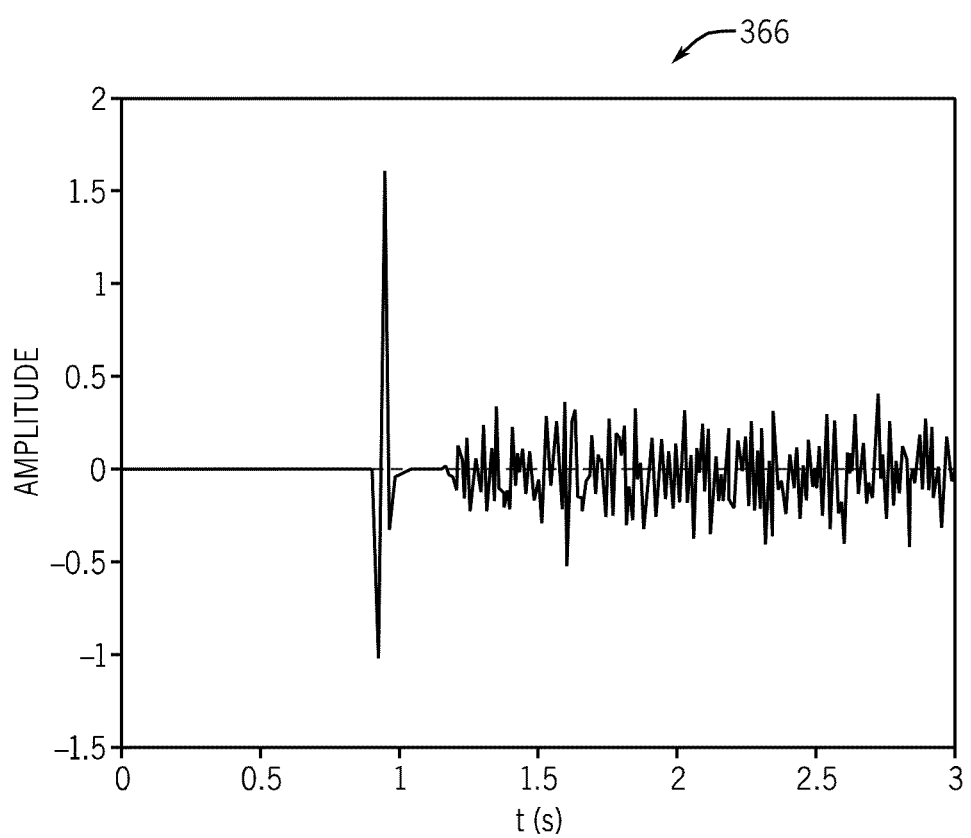
Figure 30:
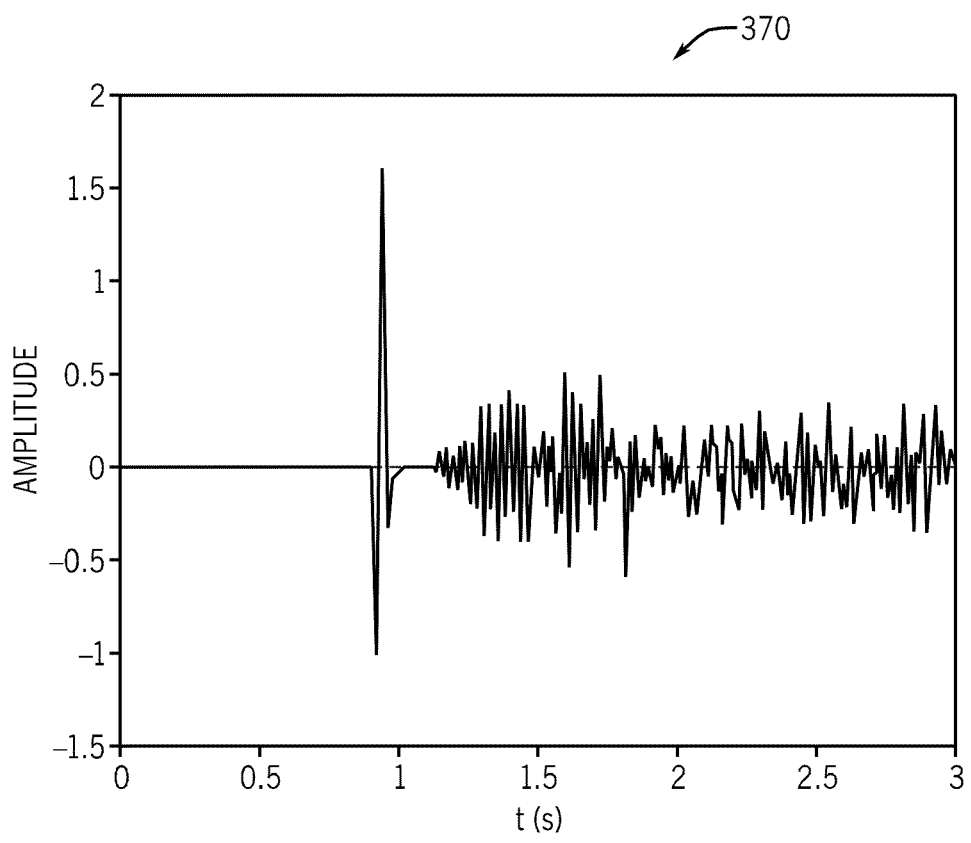
Figure 31:
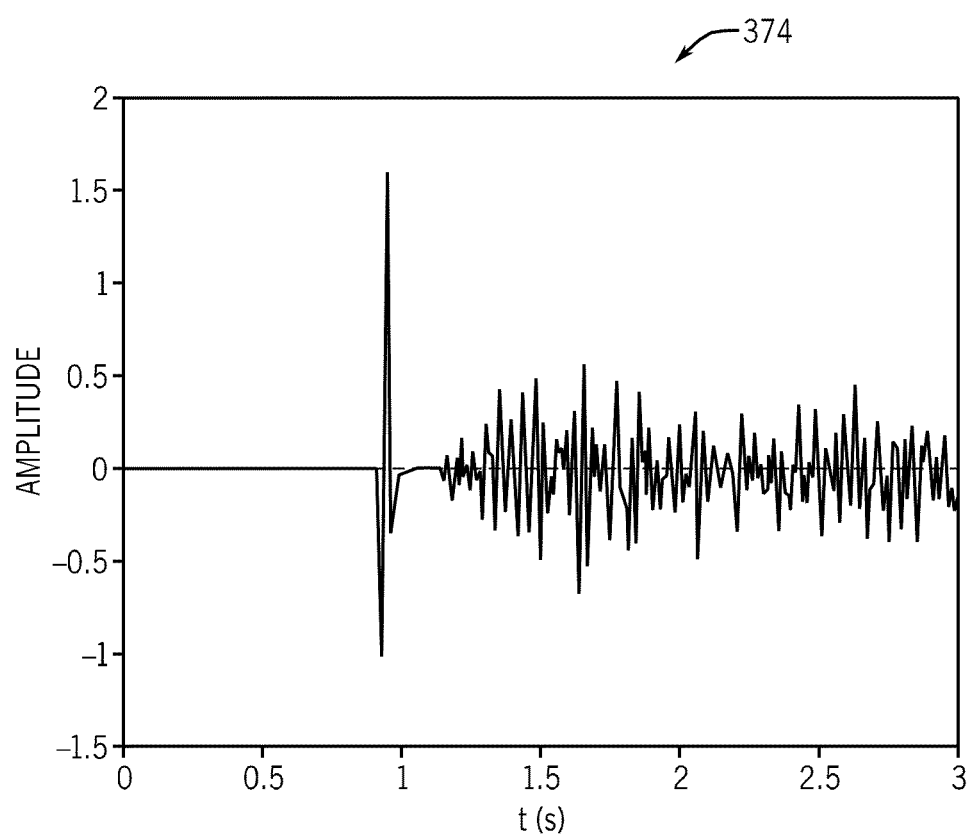
Figure 32:
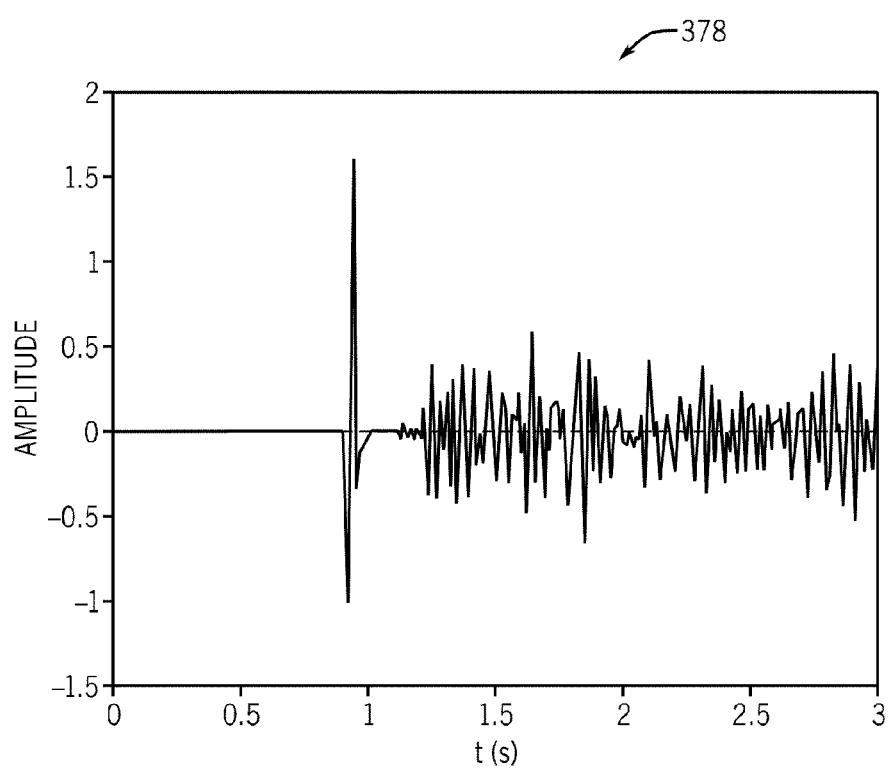

The boundary conditions may be varied with respect to time using techniques other than techniques that move the computational boundary, in accordance with other embodiments of the invention. For example, referring to FIG. 14, in accordance with other embodiments of the invention, a technique 250 includes receiving (block 254) data indicative of wavefield measurements and processing (block 258) the data on a processor-based system to generate a modeled wavefield. This processing includes creating random or pseudo random boundary conditions and changing these random boundary conditions with respect to time during the generation of the wavefield.

The random boundary conditions induce diffusive wavefields. As described below, the random boundary conditions scatter energy at the boundaries, rather than absorb the energy, to minimize coherent reflections. By running the wave equation backwards in time, the wavefield may be reconstructed.

When the disk input/output (I/O) of the source wavefields (full, or just in the boundary regions) in reverse time migration (RTM) is a bottleneck, the use of random boundaries is an alternative. The idea is that rather than absorbing energy at the boundaries, reflections are distorted to minimize coherent correlations with the receiver wavefield.

The overall cost of RTM implemented in this way is three times the forward modeling experiment. In RTM, the results from many migrated shots are summed together to form the final image. As a result, a signal-to-noise ratio (SNR) boost is obtained from neighboring shots, which have different random patterns. Random boundaries may be used, in accordance with some implementations, for the source wavefield as this is the only one that requires time reversing.

The idea may be also used for the gradient calculation in full waveform inversion (FWI). It is noted that in FWI, the forward modeling to calculate the data residuals may still use absorbing boundary conditions.

As set forth herein, by changing the random boundary conditions as a function of time, the scattered wavefields are made more random or less coherent. The advantage of doing this is to reduce correlations of coherent energy in the image (for RTM) or gradient (for FWI).

In accordance with some embodiments of the invention, time variant random or pseudo random boundaries may be modeled using a recursive integral time extrapolation (RITE) algorithm, which solves the following first order differential equation in time:

$$\left(\frac{\partial}{\partial t} + i\Phi\right)P(\vec{x};t) = 0,\qquad \text{Eq. 2}$$

where "$P(\vec{x};t)$" is a complex wavefield; "t" is time; and "$\Phi$" is a pseudo differential operator in the space domain defined by $$\Phi = \sqrt{-\nabla^2},\qquad \text{Eq. 3}$$

or by its symbol:

$$\Phi = vk = v\sqrt{k_x^2 + k_y^2 + k_z^2},\qquad \text{Eq. 4}$$

where "$k_x$," "$k_y$," and "$k_z$" represent the wavenumber components.

To solve Eq. 2 in heterogeneous media there are many possible algorithms that may be employed. As an example, a stable explicit extrapolator that is derived from an optimized separable approximation (OSA) may be used, such as the one that is set forth in Chen, J., and H. Liu, *Two Kinds Of Separable Approximations For The One-Way Wave Operator*: Geophysics, 71, No. 1, T1-T5 (2006) and Zhang Y. and G. Zhang, *One-Step Extrapolation Method For Reverse-Time Migration*: Geophysics, 74, No. 4, A29-A33 (2009).

An important point to highlight is that solutions to Eq. 2 only require the current wavefield to calculate the next wavefield. Thus, this algorithm is called the "one step RITE algorithm using OSA" herein.

A wavefield simulation was performed using a grid of 5000 m by 5000 m. The acoustic velocity in this homogenous model was 2000 m/s. The source was a Ricker wavelet with a center frequency of 25 Hz, and the Ricker wavelet was injected into the middle of the grid at x=2500 m and z=2500 m. The grid spacing was 20 m, which was the Nyquist spatial sampling, and the time step was 1 ms (ten percent of the Nyquist sampling). The simulation ran for 3000 time steps.

Figure 34:
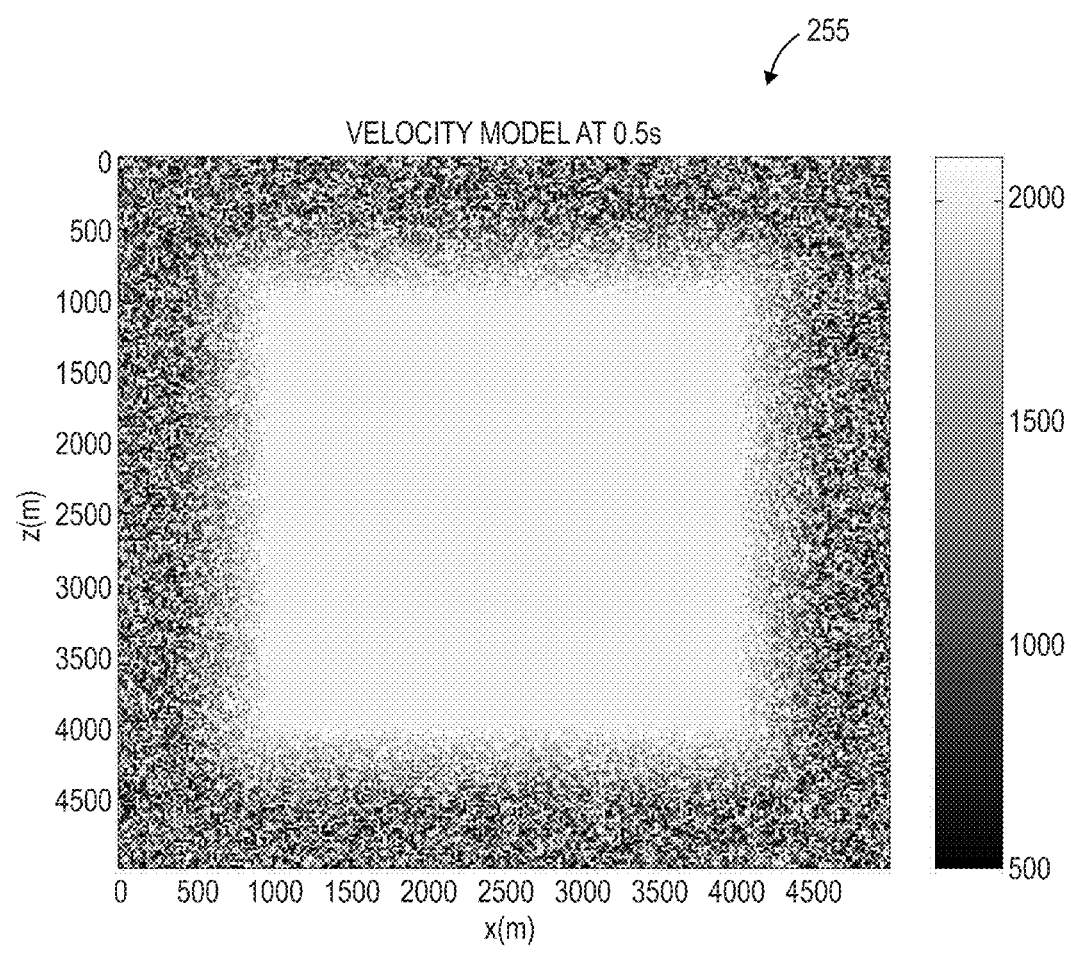
FIG. 34 is an illustration of an exemplary velocity model employing time variant random boundaries according to an embodiment of the invention.

As depicted in FIG. 34, which illustrates a velocity model 255, the random boundary for this example was 50 grid cells thick, and the random variations in the velocities increase towards the edge of the computational domain. In general, the random boundary is constructed to restrict velocity variations to ensure that any stability constraint of the modeling algorithm is not violated.

FIGS. 15, 16, 17, 18, 19 and 20 illustrate snapshots 300, 304, 308, 312, 314 and 316, respectively, at times of 0.5 s, 1 s, 1.5 s, 2.5 s and 3 s, respectively, from modeling with the RITE algorithm using OSA with a time invariant random boundary. It is noted that as the wavefront interacts with the random boundary (beginning at snapshot 308 (FIG. 17)), the wavefield is scattered.

It is noted that stability problems may result in attempting to use the pseudo-spectral algorithm. This may be due to solving a second order in time partial differential equation, where an assumption is made that the current and previous wavefields are consistent with the same model. The stability problems are not present with the RITE algorithm with OSA, however, as the algorithm uses the current wavefield.

FIGS. 21, 22, 23, 24, 25 and 26 illustrate snapshots 330, 334, 336, 340, 344 and 348 of the wavefield at 3 seconds changing the realization of the random boundary at sampling rates of 1 ms, 3 ms, 10 ms, 20 ms, 40 ms and once, respectively. As can be seen from the snapshot 330 (FIG. 21), when the rate is ten percent of Nyquist sampling, the reflections from the boundary are clearly coherent. This is due to the wavefield effectively experiencing an average velocity. A similar effect is seen with a time invariant random boundary if the spatial random variations (grid size) are small relative to the spatial Nyquist rate. As the sampling rate is increased to 30% of the Nyquist rate, as depicted in snapshot 334 (FIG. 22), the boundary reflections are much less coherent but still visible.

At the Nyquist sampling rate (see snapshot 336 (FIG. 23)), the boundary reflection is no longer coherent. As the rate of changing the realization of the random boundary is increased above the Nyquist sampling rate, the scattered wavefield becomes more coherent tending towards the coherency present in the result from keeping the random boundary fixed over time.

FIGS. 27, 28, 29, 30, 31 and 32 depict seismograms recorded at spatial location (1250 m, 1250 m) using the one step RITE algorithm with OSA and randomizing the boundary every 1 ms (seismogram 360 (FIG. 27)), 3 ms (seismogram 364 (FIG. 28)), 10 ms (seismogram 366 (FIG. 29)), 20 ms (seismogram 370 (FIG. 30)), 40 ms (seismogram 374 (FIG. 31)), and once (seismogram 378 (FIG. 32)). For rates changing the realization of the random boundary well below the Nyquist sampling rate (i.e., for seismograms 360 and 364), the reflection from the boundary can be readily identified. For increasing rates above Nyquist (i.e., seismograms 366, 370, 374 and 378), the scattered wavefield tends towards the coherency in the result from keeping the random boundary fixed over time. Thus, at the Nyquist rate, the scattered wavefield is less coherent than the scattered wavefield from keeping the random boundary fixed for the simulation.

It is noted that the uplift from using time variant random boundaries is more noticeable at earlier times. At much later times, the scattered wavefield with a time invariant random boundary is likely to have undergone more interactions with the random boundary, thereby reducing the level of coherent energy as time increases. Other variations are contemplated and are within the scope of the appended claims. For example, rather than changing the realization of the random boundary at the Nyquist sampling rate, there may be more optimal space-time variant encodings, which rely upon alternating cells in the boundary at which to add variations.

A time invariant random boundary region may be thought of as a series of point sources that are excited at different times. By cross-correlating the energy at any two locations, a two-way interferometric Green's function may be generated. The idea of using time variant medium parameters to create a more diffusive wavefield may also provide improvements in this application or any application that involves cross-correlation of seismograms.

Figure 33:
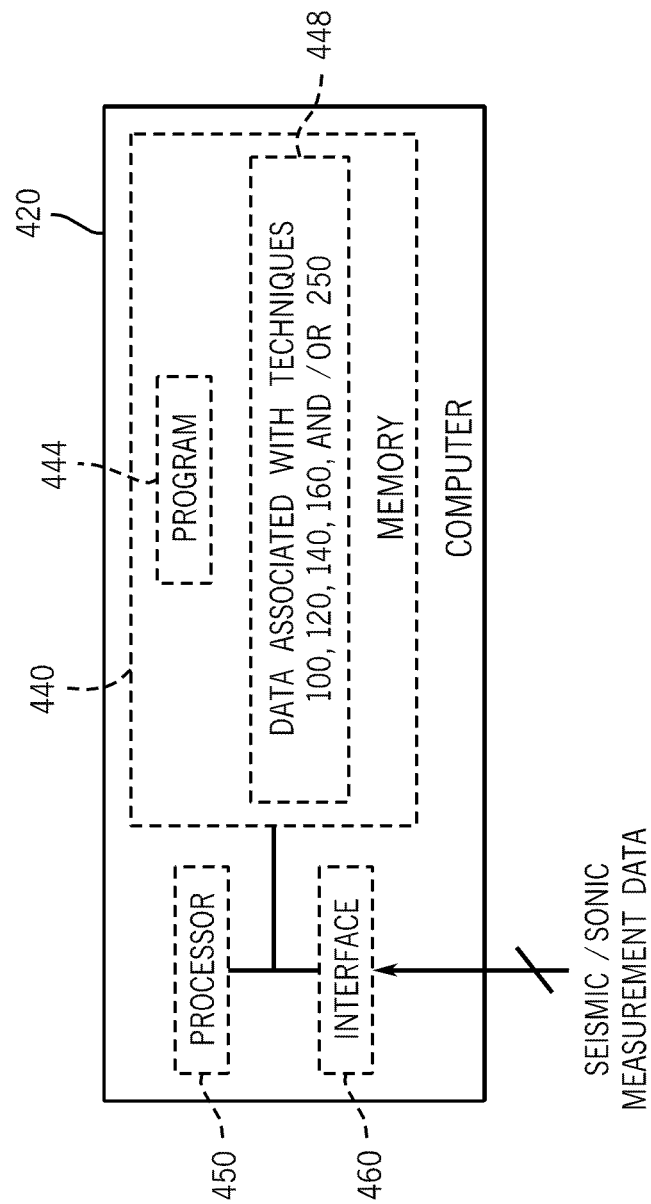
FIG. 33 is a schematic diagram of a data processing system according to an embodiment of the invention.

Referring to FIG. 33, in accordance with some embodiments of the invention, a data processing system 420 contains a processor 450 that processes acquired seismic data to perform at least some parts of one or more of the techniques that are disclosed herein for such purposes (as non-limiting examples) as receiving measurements of a wavefield, such as seismic measurements indicative of a seismic wavefield, sonic measurements indicative of a sonic wavefield or EM measurements indicative of an EM wavefield; processing the measurement data to generate a modeled wavefield; process the measurement data to generate images indicative of the measured wavefield; processing the measurement data to generate velocities or velocity models associated with the measured wavefield; processing the measurement data to compute velocity gradients associated with the modeled wavefield; during the modeling of the wavefield, varying boundary conditions of the computational domain; during generation of the modeled wavefield, minimizing coherent boundary reflections within a predefined frequency range of interest; during generation of the modeled wavefield, moving computational boundaries of the modeled wavefield with respect to time; during generation of the modeled wavefield, moving the boundaries of the modeled wavefield in accordance with a real world phenomena, such as sea wave motion; during the generation of the modeled wavefield, creating a Doppler shift in coherent boundary reflections to shift frequencies of energy of the coherent boundary reflections outside of a region of interest; during generation of the modeled wavefield, encoding boundary reflections using phase encoding; during generation of the modeled wavefield, introduce pseudo random or random velocities at computational boundaries of the wavefield; during generation of the modeled wavefield, varying medium parameters with respect to time to create a diffusive wavefield; generating data indicative of initial, intermediate or final results of wavefield modeling as well as images associated with initial, intermediate or final results of wavefield modeling; generating images indicative of seismograms of the modeled wavefield; generating images indicative of snapshots of the modeled wavefield; etc.

In accordance with some embodiments of the invention, the processor 450 may be formed from one or more microprocessors and/or microcontrollers. As non-limiting examples, the processor 450 may be located on a streamer 30 (see FIG. 1), located on the vessel 20 (see FIG. 1), distributed among multiple streamers 30, located on a land-based processing facility, distributed among separate land-based facilities, etc.

As depicted in FIG. 33, the processor 450 may be coupled to a communication interface 460 for purposes of receiving such data as acquired particle motion measurements, acquired pressure measurements, acoustic data, data indicative of previously-calculated wavefields; data indicative of velocity models, etc. As non-limiting examples, the communication interface 460 may be a Universal Serial Bus (USB) interface, a network interface, a removable media (a flash card, CD-ROM, etc.) interface or a magnetic storage interface (an IDE or SCSI interface, as non-limiting examples). Thus, the communication interface 460 may take on numerous forms, depending on the particular embodiment of the invention.

In accordance with some embodiments of the invention, the communication interface 460 may be coupled to a memory 440 of the system 420 and may store, for example, various input, output and/or intermediate result datasets involved in the techniques and systems that are described herein, such as the techniques 100, 120, 140, 160 and/or 250. The memory 440 may store program instructions 444, which when executed by the processor 450 may cause the processor 450 to perform various tasks of one or more of the techniques and systems that are disclosed herein; and the system 420 may display preliminary, intermediate and/or final results obtained via the technique(s)/system(s) on a display device (not shown in FIG. 33) of the system 420, such as a computer monitor in accordance with some embodiments of the invention.

Other embodiments are contemplated and are within the scope of the appended claims. For example, systems and techniques are disclosed above for purposes of generating a modeled wavefield from data indicative of wavefield measurements. However, in accordance with other embodiments of the invention, the modeled data may be generated from synthetic wavefield data that are not actual wavefield measurements. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    receiving data indicative of a wavefield in a processor-based system; and
    processing the data using at least one processor to generate a modeled wavefield, the processing including varying boundary conditions of the modeled wavefield with respect to time to regulate coherent boundary reflections in the modeled wavefield, the coherent boundary reflections being attributable to reflections of the modeled wavefield from outer boundaries of a modeled space used to generate the modeled wavefield.

2. The method of claim 1, wherein the data indicative of the wavefield comprises data indicative of wavefield measurements or data indicative of a synthetic wavefield.

3. The method of claim 1, wherein the act of processing the data on the processor minimizes the coherent boundary reflections within a predefined frequency range.

4. The method of claim 1, wherein the act of processing the data on the processor comprises:
moving boundaries of the modeled wavefield with respect to time.

5. The method of claim 4, further comprising:
moving the boundaries to model sea wave motion.

6. The method of claim 4, wherein the act of moving the boundaries comprises:
creating a Doppler shift in the coherent boundary reflections to shift frequencies of energy of the coherent boundary reflections outside of a region of interest.

7. The method of claim 4, wherein the act of moving comprises:
expanding a spatial grid associated with the modeled wavefield.

8. The method of claim 4, wherein the act of moving comprises:
contracting a spatial grid associated with the modeled wavefield.

9. The method of claim 4, wherein the act of moving comprises phase encoding the boundary reflections, the method further comprising:
removing the phase encoded boundary reflections.

10. The method of claim 1, wherein the act of processing the data on the processor comprises:
creating substantially random boundaries; and
changing the substantially random boundaries with respect to time.

11. The method of claim 10, wherein the act of creating the substantially random boundaries comprises:
imparting increasingly substantially random velocities at the boundaries.

12. The method of claim 1, wherein the act of processing the data on the processor comprises:
varying medium parameters with respect to time to create a diffusive wavefield.

13. The method of claim 1, further comprising:
using the modeled wavefield to generate an image indicative of a subterranean body of interest.

14. An article comprising a non-transitory computer readable storage medium to store instructions that when executed by a computer cause the computer to:
receive data indicative of a wavefield; and
process the data to generate a modeled wavefield, including varying boundary conditions of the modeled wavefield with respect to time to regulate coherent boundary reflections in the modeled wavefield, the coherent boundary reflections being attributable to reflections of the modeled wavefield from outer boundaries of a modeled space used to generate the modeled wavefield.

15. The article of claim 14, the storage medium storing instructions that when executed by the computer cause the computer to move boundaries of the modeled wavefield with respect to time.

16. The article of claim 14, the storage medium storing instructions that when executed by the computer cause the computer to:
create substantially random boundaries; and change the substantially random boundaries with respect to time.

17. A system comprising:
an interface to receive data indicative of a wavefield; and
a processor to process the data to generate a modeled wavefield, the processing including varying boundary conditions of the modeled wavefield with respect to time to regulate coherent boundary reflections in the modeled wavefield, the coherent boundary reflections being attributable to reflections of the modeled wavefield from outer boundaries of a modeled space used to generate the modeled wavefield.

18. The system of claim 17, wherein the processor is adapted to move boundaries of the modeled wavefield with respect to time.

19. The system of claim 18, wherein the processor is adapted to move the boundaries to model sea wave motion.

20. The system of claim 18, wherein the processor is adapted to create a Doppler shift in the coherent boundary reflections to shift frequencies of energy of the coherent boundary reflections outside of a region of interest.

21. The system of claim 17, wherein the processor is adapted to expand or contract a spatial grid associated with the modeled wavefield.

22. The system of claim 17, wherein the processor is adapted to:
create substantially random boundaries; and
change the substantially random boundaries with respect to time.

23. The system of claim 22, wherein the processor is adapted to impart increasingly substantially random velocities at the boundaries.

24. The system of claim 17, wherein the processor is adapted to vary the medium parameters with respect to time to create a diffusive wavefield.

25. The article of claim 14, the storage medium storing instructions that when executed by the computer cause the computer to minimize the coherent boundary reflections within a predefined frequency range.

26. The system of claim 17, wherein the processor is adapted to minimize the coherent boundary reflections within a predefined frequency range.

* * * * *